April 6, 1954

E. LALANNE 2,674,144

REPRODUCING MACHINE TOOL

Filed Nov. 6, 1950

INVENTOR
EDMOND LALANNE
BY
ATTORNEYS

April 6, 1954  E. LALANNE  2,674,144
REPRODUCING MACHINE TOOL
Filed Nov. 6, 1950  3 Sheets-Sheet 2
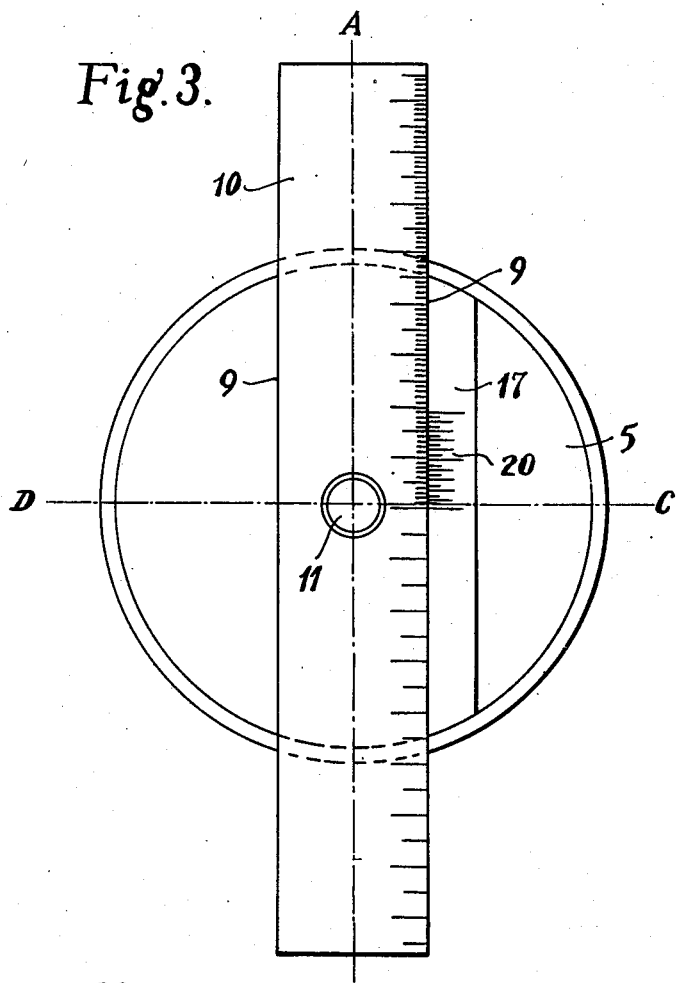
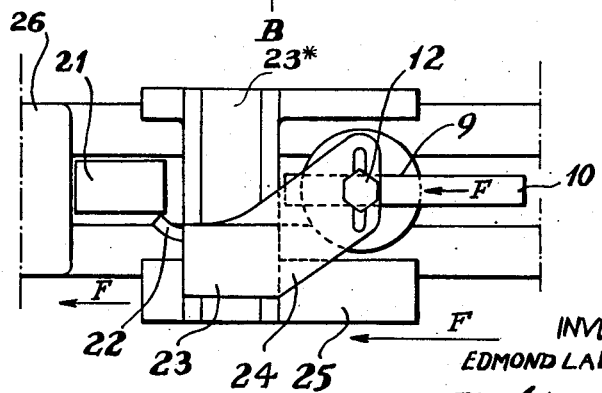
INVENTOR
EDMOND LALANNE
BY
ATTORNEYS April 6, 1954  E. LALANNE  2,674,144
REPRODUCING MACHINE TOOL
Filed Nov. 6, 1950  3 Sheets-Sheet 3

INVENTOR
EDMOND LALANNE
BY
ATTORNEYS.

Patented Apr. 6, 1954

2,674,144

UNITED STATES PATENT OFFICE 2,674,144

REPRODUCING MACHINE TOOL

Edmond Lalanne, Marseille, France

Application November 6, 1950, Serial No. 194,215

1 Claim. (Cl. 82—17)

The present invention relates to taper attachments for lathes of the kind comprising the conventional bed, a carriage movable thereon in the axial direction of the usual head stock, a cross-slide mounted for movement on the carriage, and a tool carrier supported on the cross-slide, its object being to provide a novel construction having improved means for clamping the taper attachment to the bed of the lathe.

According to the present invention, in a lathe of the kind referred to, the taper attachment comprises a frame adjustably carried on the bed of the lathe, a guide block rotatably mounted on the frame and arranged for rotational adjustment in a plane parallel to the plane in which the cross-slide moves, said guide block having a parallel-sided slot at its upper part, a slide slidably engaged in said slot and adjustably coupled to the tool carrier, and means for clamping the frame on the bed comprising a yoke engaged below the bed, a screw-threaded spindle carried on the yoke and passed through the frame, a first pinion mounted in the guide block so as to be rotatable but prevented from axial movement, said first pinion having a threaded bore receiving the spindle of the yoke, and a shaft for manual operation mounted rotatably in the guide block and carrying a second pinion meshing with the first pinion for rotation of the first pinion to cause the yoke to move towards and away from the frame and guide block.

The guide block or frame may be provided with a degree scale for setting the guide block at a predetermined angle with respect to the axis of the spindle of the lathe, and the other of the two said members may be provided with a scale to coact with the degree scale and form a vernier therewith.

Linear scale means may be provided for the slide and guide block for determining the length of movement or relative position of the slide with respect to the guide block.

In the accompanying drawings, which are schematic and given by way of example of one of the forms of construction of the invention:

Figure 3 is a plan view of the slide and guide block.

Figure 1:
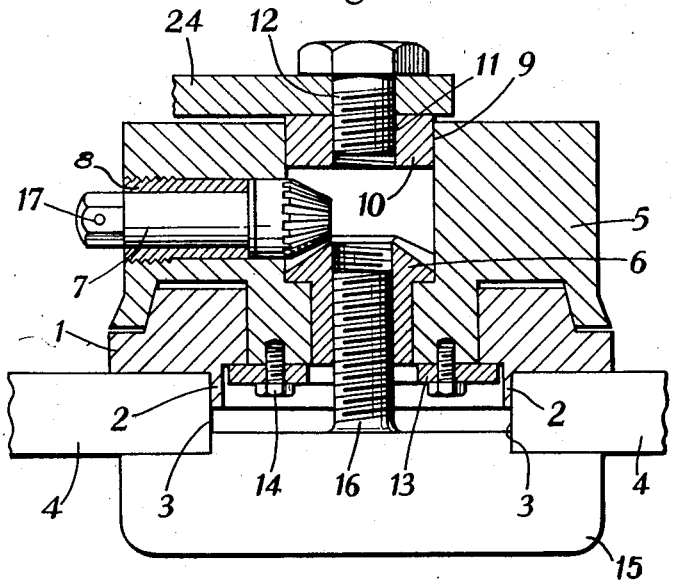
Figure 1 represents in vertical section, the members constituting the attachment.
Figure 2:
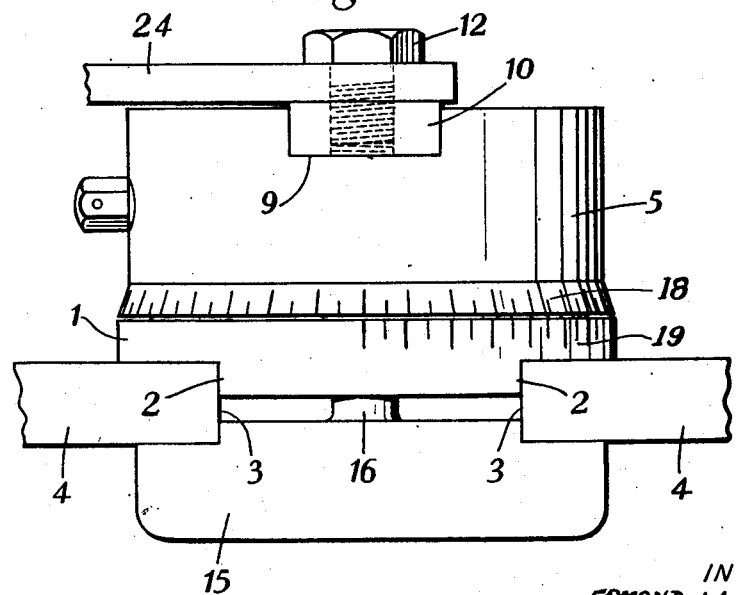
Figure 2 shows an elevation thereof.

Figures 4, 5, 6, and 7 represent schematically applications of the attachment.

The attachment is constituted by a frame 1 which is adjustably seated by walls 2 in the axial slideway 3 of the lathe bed 4 and can be moved to determine the setting of the apparatus along the longitudinal axis of the headstock of the lathe. The frame carries a pivoted guide block 5 provided at its central part with a cylindrical recess receiving a conical pinion 6 forming a nut. Another cylindrical recess at 90° to the first receives a second conical pinion carried on a shaft 7 turning within a sleeve 8 screw-threaded in the said recess. The pinion 6 is internally threaded to coact with a spindle 16 on a yoke 15 which rides below the bed. Rotation of a key shaft 17 causes vertical movement of the yoke 15 to grip or release the bed.

A ring 13 serves to couple the frame 1 and guide block 5 and is fixed to this latter by the screws 14.

On the exterior periphery of the guide block 5 is engraved a scale 18 having 360 graduations each representing a degree of circumference, and being numbered from 0 to 90 in each direction starting from two lines AB—CD which cross in the axis of the apparatus and at exactly 90°, Figure 3.

The degree numberings are omitted from the drawing for clarity.

A vernier scale 19 comprising 60 divisions equal in total length to 59° of the degree scale on the guide block, is engraved on the frame 1 in such a manner that each of its graduations corresponds to an angular displacement of the guide block 5 of 1 minute. This device permits the adjustment and disposition of the apparatus at the desired angle, with a very great precision.

The guide block 5 has at its upper part a parallel-sided slot 9 receiving a slide 10 graduated in millimetres along the whole of its length, only a representative number of graduations being shown. On the upper wall of the slot 9 is engraved a vernier scale 20. This device permits the user to determine, by simple reading-off, the length of the work-piece which has been machined.

The slide 10 has a bore 11 receiving a bolt 12 securing a connecting member 24 rigidly secured to the tool carrier 23 mounted on a cross-slide moving in the guide way 23 and shown schematically only. The cross-slide is in turn carried on a carriage 25 movable parallel to the axis of the head-stock 26. 22 is a tool carried in the tool carrier 23.

The operation of the apparatus is as follows:

A work piece 21 is put in position on the usual mandrel and the tool 22 is brought up to its starting point for the cut which is in this example the turning of the external cylindrical face of a cylindrical shaft.

The attachment is fixed on the bed of the lathe in such a position that the connecting member 24 fast to the tool carrier 23 is suitably placed for fixing by the bolt 12 to the slide 10. The operator then sets the lathe in motion and advances the carriage 25 manually in the direction of the arrows F.

The cut is guided by the slide 10 moving in the slot 9 thereby eliminating any inherent slackness or play of the lathe.

Figure 5:
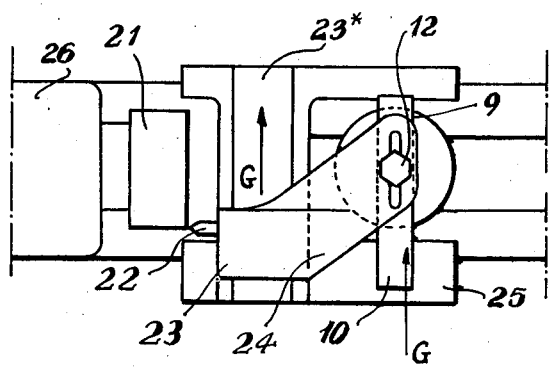

When it is desired to work a face, Figure 5, the slot 9 of the guide block 5 is orientated at 90° to the longitudinal axis of the head-stock and the connecting member 24 is secured to the slide 10. The lathe being put in motion, the tool carrier 23 is moved in the direction of the arrows G by the cross-slide, and the guide 10 sliding in the slot 9 guides the precision of the cut, even if the carriage and other members of the lathe normally have play on their slideways or otherwise.

Figure 6:
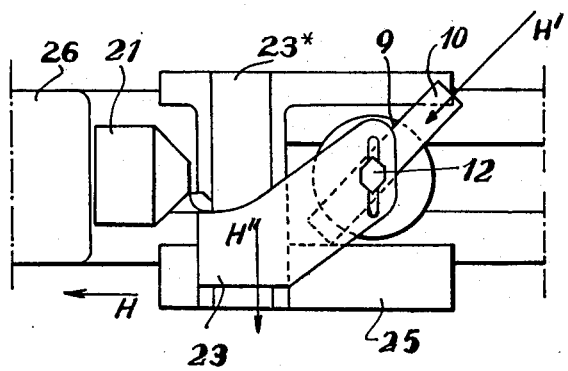

In order to turn a conical surface on the work-piece 21, Figure 6, the slot 9 is orientated according to the angle required, and the cone to be formed. The connecting member 24 is locked to the slide 10 by the bolt 12 and the operator then moves the carriage 25 in the direction of the arrows H. At this moment, the tool carrier 23 being actuated by the displacement of the slide 10 in the direction of the arrow H'', has a movement which is the resultant of the two movements in the directions H and H', thereby reproducing the path of the cut to be followed.

Figure 7:
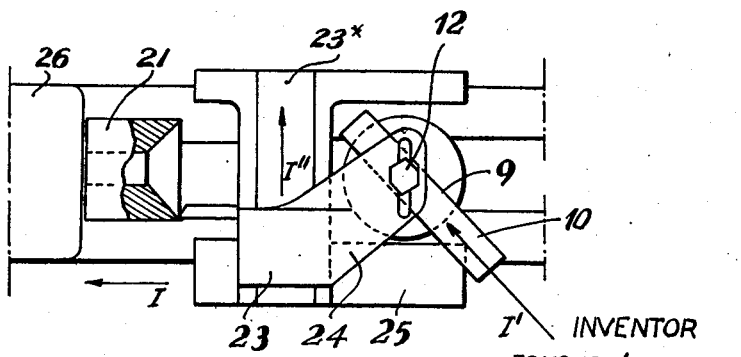

Finally, if it is required to produce a cone which is the inverse of the preceding example, see Figure 7, the slide 10 is freed temporarily by releasing the bolt 12 and the tool is then disposed at the point of departure of the cut. The bolt 12 is then tightened again after the slide 10 has been orientated at the desired angle for the work to be done.

The carriage 25 is then operated in the direction of the arrow I. At this moment, the tool carrier 23 is moved by the displacement of the slide 10 and is itself displaced in the direction of the arrow I''. The co-ordination of these two movements I and I'' causes the tool to reproduce very exactly on the work-piece the angle determined by the guide block 5.

I claim:

In a lathe having the conventional bed with a carriage movable thereon in the axial direction of the usual headstock and a cross-slide mounted for movement on the carriage and supporting a tool carrier, a taper attachment comprising a frame adjustably carried on the bed of the lathe, a guide block rotatably mounted on the frame and arranged for rotational adjustment in a plane parallel to the plane in which the cross-slide moves, said guide block having a parallel-sided slot at its upper part, a slide slidably engaged in said slot and adjustably coupled to the tool carrier, and means for clamping the frame on the bed comprising a yoke engaged below the bed, a screw-threaded spindle carried on the yoke and passed through the frame, a first pinion mounted in the guide block so as to be rotatable but prevented from axial movement, said first pinion having a threaded bore receiving the spindle of the yoke and a shaft for manual operation mounted rotatably in the guide block and carrying a second pinion meshing with the first pinion for rotation of the first pinion to cause the yoke to move towards and away from the frame and guide block thereby clamping and unclamping the frame to the lathe bed.

References Cited in the file of this patent
UNITED STATES PATENTS

| Number | Name | Date |
|--------|------|------|
| 667,912 | Hazlet | Feb. 12, 1901 |
| 728,398 | Kington et al. | May 19, 1905 |
| 1,698,319 | Quedens | Jan. 8, 1929 |
| 2,015,120 | Mussler | Sept. 14, 1938 |
| 2,104,238 | Nichols | Jan. 4, 1938 |
| 2,250,161 | Johnson | July 22, 1941 |
| 2,453,111 | Bell | Nov. 9, 1948 |